United States Patent

[11] 3,563,145

| [72] | Inventors | Leonard V. Bendoni<br>Hyde Park;<br>Irving Erlichman, Wayland, Mass. |
|---|---|---|
| [21] | Appl. No. | 743,441 |
| [22] | Filed | July 9, 1968 |
| [45] | Patented | Feb. 16, 1971 |
| [73] | Assignee | Polaroid Corporation<br>Cambridge, Mass. |

[54] FILM TRANSPORTING APPARATUS
14 Claims, 3 Drawing Figs.

[52] U.S. Cl. ............................................. 95/13, 95/89
[51] Int. Cl. ....................................... G03b 17/50
[50] Field of Search ....................................... 95/13, 89

[56] References Cited
UNITED STATES PATENTS

| 3,344,730 | 10/1967 | Bartlett et al. | 95/89 |
| 3,369,469 | 2/1968 | Downey | 95/13 |
| 3,447,437 | 6/1969 | Tiffany | 95/13 |

*Primary Examiner*—John M. Horan
*Assistant Examiner*—Richard M. Sheer
*Attorney*—Brown and Mikulka, Robert E. Corb and Alfred E. Corrigan ABSTRACT: A self-developing camera including a pair of processing rolls which are mounted for movement away from each other when a film unit enters the nip of the rolls. A reciprocating film unit engaging member is coupled to one of the rolls for movement toward and away from a container housing a plurality of film units to move a film unit subsequent to exposure from the container into engagement with the rolls. The rolls rotate and the film unit engaging member reciprocates continuously and simultaneously and structure is provided for sensing the movement of one of the rolls away from the other to disenable the film unit engaging member to move another film unit from the container at least until the preceding film unit has advanced from engagement with the rolls.

INVENTORS
LEONARD V. BENDONI
IRVING ERLICHMAN
BY Brown and Mikulka
and
Alfred E. Corrigan
ATTORNEYS

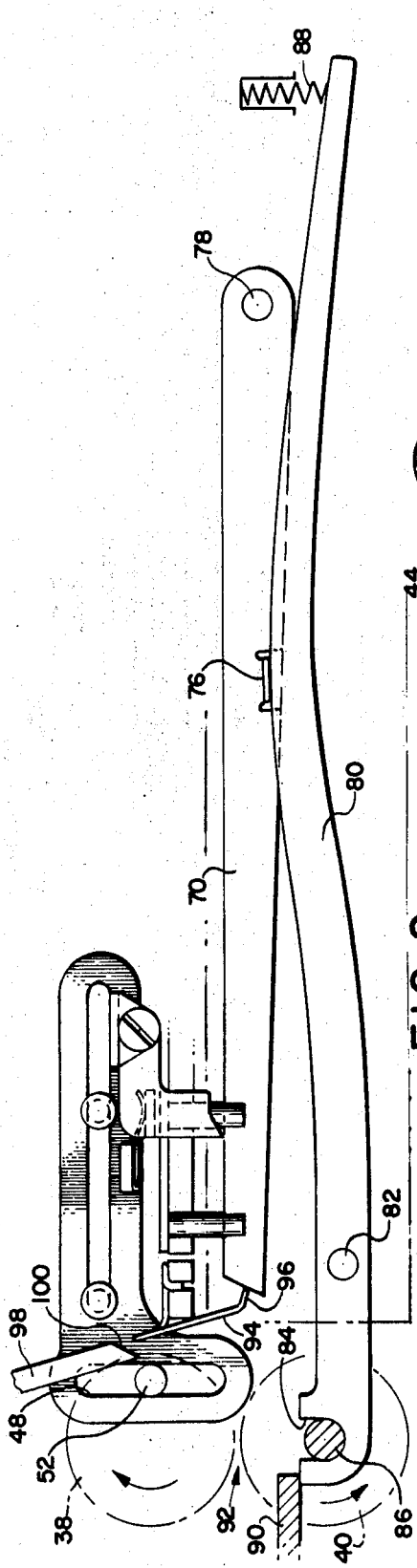
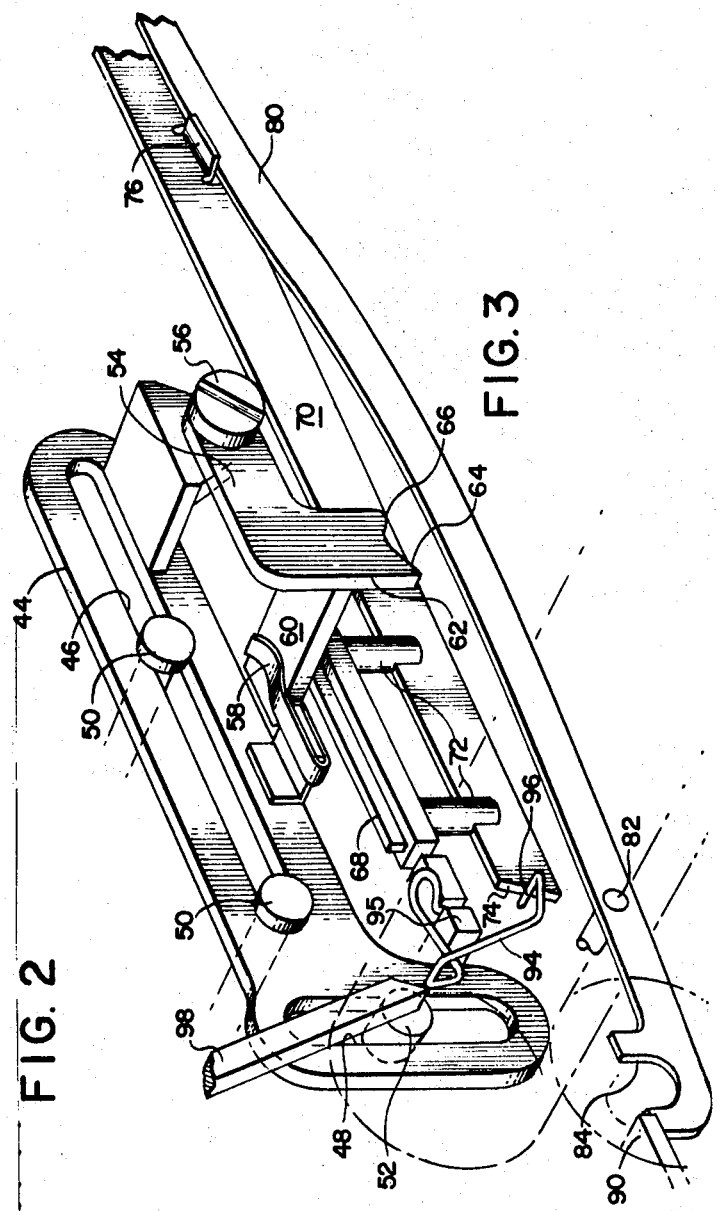

FILM TRANSPORTING APPARATUS

The present invention is concerned with improvements in photographic apparatus such as cameras of the self-developing type adapted to be employed with a film assemblage or pack including a container housing a plurality of photosensitive elements or film units arranged in stacked relation and adapted to be exposed, in sequence, within the container and withdrawn therefrom following exposure. Subsequent to being withdrawn from the container, each film unit including, for an example, a photosensitive element and a superposed image-receiving element, is processed by moving the superposed elements between a pair of juxtaposed pressure-applying member, usually rolls, located within the photographic apparatus adjacent an opening in an end wall of the film container, in order to distribute a processing liquid between the superposed elements.

Structure is provided for automatically driving the rolls and for moving the exposed film unit from the container into the nip of the rolls. This structure may take the form of a film engaging member mounted for reciprocating motion toward and away from the container to engage and move an exposed film unit into engagement with the rolls. It is important that the film unit engaging member reciprocate continuously in order to insure that the film unit will be advanced sufficiently to move into engagement with the rolls. However, once the film unit is in engagement with the rolls the film unit engagement member must be disenabled or prevented from withdrawing the next film unit which, at this time, has not been exposed. Accordingly, an object of the invention is to provide, in photographic apparatus of the type set forth above including driven processing rolls and means for withdrawing a film unit from a container and advancing it into the nip of the processing rolls, means responsive to engagement of a film unit between the rolls for preventing the withdrawal of another film unit from the container at least until the preceding film unit has passed from between the rolls.

Another object of the invention is to provide in photographic apparatus of the foregoing type including a shutter for controlling the exposure of a film unit within a container and means for actuating said shutter, means responsive to actuation of the shutter for enabling subsequent movement of said film unit, following exposure, from said container.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is an enlarged view of the film advancing apparatus and disenabling means therefore, the processing rolls and film container being shown in broken lines to facilitate an understanding of the invention; and FIG. 3 is a perspective view of a portion of one side of the camera.

Figure 1:
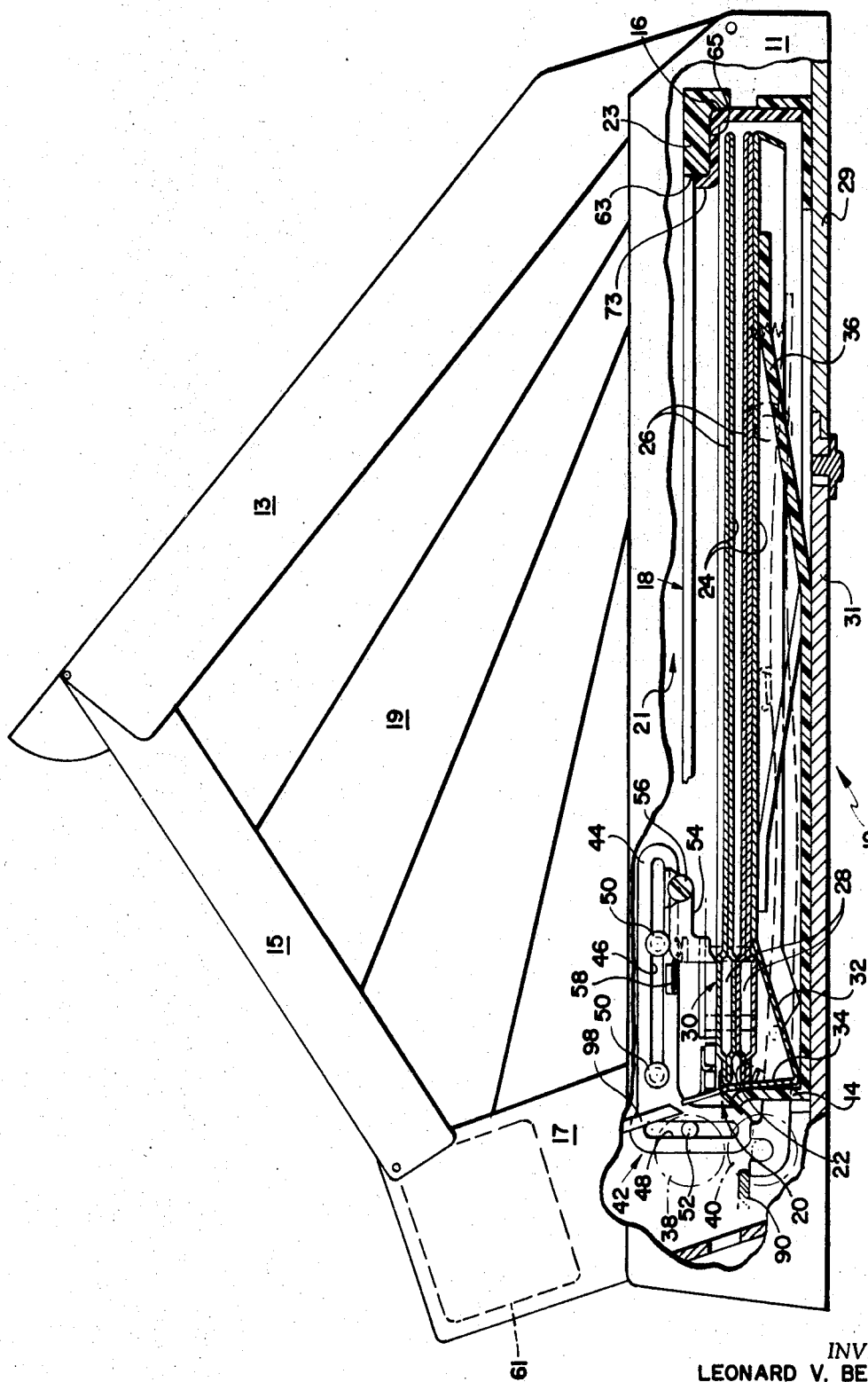
FIG. 1 is an elevation view, partly in section, of a camera incorporating film advancing apparatus embodying the invention, the section being taken substantially along a line midway between the sides of the camera.

Reference is now made to FIG. 1 of the drawings wherein is illustrated a camera 12 adapted to be employed with a film assemblage or pack of the type including a container 14, having a forward wall 16 provided with an exposure aperture 18 and a film withdrawal opening 20 which extends substantially the width of the container 14.

A plurality of stacked film units 22, only two of which are shown, are positioned within container 14 behind exposure aperture 18 with the forwardmost film unit located in position for exposure. Film units 22 are preferably of the type shown and described in detail in the U.S. Pat. application of Edwin H. Land, Ser. No. 622,287 and Edwin H. Land et al., Ser. No. 622,286, both filed Mar. 10, 1967. Film units of this type each incorporates all of the materials necessary to produce a positive photographic print including a photosensitive element 24, a second or image-receiving element 26 which is transparent and is secured in face-to-face relation with the photosensitive element, and a rupturable pod 28 of processing liquid secured to one end of the photosensitive and second elements for dispensing its liquid contents therebetween in response to the application of compressive pressure to the pod 28. Each film unit is adapted to be processed by advancing the film unit, pod 28 foremost, between a pair of pressure-applying members which dispense the liquid contents of the pod therefrom between the photosensitive and second elements and spread the liquid between and in contact with the two elements toward the trailing end thereof.

Each film unit 22 is provided with one or more openings (not shown) formed therein near one edge thereof, said openings being adapted to receive means for moving the film unit, subsequent to exposure, from the container and into the bite or nip of a pair of rolls as will be explained more clearly hereinafter. Any other suitable means, e.g., a series of rearwardly (to the right as viewed in FIG. 1) canted corrugations, may be provided near the edge of the film unit for accomplishing the same purpose.

The image-forming process is well known in the art and involves the formation of an imagewise distribution of transferable image-forming substances in the exposed photosensitive element and diffusion of the image-forming substances to another layer within the film unit where they form a visible, positive image. As described in the aforementioned applications, the processing liquid includes an opacifying agent which is spread in a layer between the photosensitive element (which is preferably opaque to actinic light), and the transparent image-receiving element 26 for providing a background for the positive transfer image and masking any image formed in the photosensitive element.

Camera size can be reduced and higher degree of compactness achieved by eliminating the necessity for a processing or imbibition chamber in the camera intowhich the film unit is advanced and retained in a light-free environment during image formation. Accordingly, the film unit is designed to be advanced from the camera into the light immediately after the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 26 during processing outside the camera.

Film container 14 is provided with a thin elongated slot 30 which extends from a position adjacent the leading edge of the container rearwardly. Slot 30 is dimensioned to receive a film engaging means or pick as will be explained hereinafter. Container 14 is also provided with light seal and hold back member 32 made from an opaque material. Member 32 has a portion 34 which extends across opening 20 to prevent the admission of light therethrough and to prevent the withdrawal of more than one film unit at a time through opening 20. Also, biasing means 36 in the form of springs are provided for resiliently urging the film units 22 towards and in alignment with exposure aperture 18. For a more detailed description of the film container and film units, reference is made to the copending U.S. applications of Irving Erlichman, Ser. No. 713,648, filed on Mar. 18, 1968 and Ser. No. 713,766, filed Mar. 18, 1968.

Camera 12, which is of the collapsible type, is shown in FIG. 1 in its operative or extended position and is comprised of a plurality of sections 11, 13, 15, 17 pivotally connected to each other and which define four sides of a substantially light-free exposure chamber 21. The two remaining sides of the exposure chamber are closed by a pair of extensible bellows 19

(only one of which is shown). Section 11 is provided with a support means in the form of a forward wall 23 which cooperates with a door 29 and a rear wall 31 to properly position the film container 14 containing the plurality of stacked film units 22 within the camera such that an end (forwardmost) film unit is in position for exposure. Forward wall 23 is provided with an aperture 63, similar to and in alignment with aperture 18, into which a lip 73 on container 14 protrudes. Wall 23, which extends to substantially the end of container 14 having the withdrawal slot 20, and an upper portion of container 14 are shown partially cut away in order to more clearly show the film advancing apparatus of the instant invention. Wall 23 has a rear surface 65 which is located adjacent to the focal plane of the camera. Wall 31 may be provided with suitable means, e.g., a spring or elastomeric pad, for urging the container 14 towards support member 23. Section 17 is provided with a conventional lens and shutter assembly, the latter preferably being of the automatic type, for exposing a film unit 22 positioned for exposure within the camera housing. An interior wall of section 13 is provided with a substantially planar mirror for reflecting light from the lens towards a film unit positioned for exposure in section 11.

The camera includes a pair of pressure-applying members or rolls 38, 40 mounted in juxtaposition within section 11 and a motor 61 for driving the rolls mounted in section 17. The rolls 38, 40 are adapted to receive a film unit, subsequent to exposure, in their nip and apply sufficient pressure to break the pod 28 and evenly distribute the processing liquid within the pod between the sheets 24, 26 to produce a positive photographic print. For a more detailed description of the camera, reference is made to the copending U.S. Pat. application of Land et al., Ser. No. 655,850, filed Jul. 25, 1967.

Heretofore, means such as friction wheels were provided for moving a sheet of material from a container into the nip of a pair of juxtaposed rolls. When it was desired to obtain a sheet of the material, a switch was actuated to connect the friction wheel with a source of power. Once connected to the source of power the friction wheel would rotate to move the sheet from the container into the nip of the rolls and then the cycle would by completed by disconnecting the friction wheel from the power source. Should the friction wheel fail to move the sheet from the container, the operator of the machine merely had to start the cycle again and the only loss involved would be time. However, in photographic apparatus such as a camera, the means for moving an exposed film unit from the film container into the bite of the rolls must not only be simple and compact but also dependable. Should the means for moving the film unit from the container fail, there will be a loss of more than time. Failure to move the film unit, subsequent to exposure, from the container into the nip of the rolls will result in the loss of at least two film units should the user of the camera have to open the camera in order to manually remove the exposed film unit thereby double exposing that film unit and exposing the next film unit in the camera.

According to the instant invention, performance of the film-feeding operation, an intermediate step in an exposure and processing cycle, is assured by operating continuously the means for moving a film unit from the container until the film unit has been fed into the nip of the rolls and thereby avoid the necessity for repeating the cycle, particularly the exposure step. Continuous operation of the means for moving the film unit during a processing cycle means that it may be possible to move a second film unit from exposure position toward the nip of the rolls before processing of the preceding film unit is complete. Accordingly, means are provided for disenabling the film moving means to move a film unit within the container whenever a film unit is engaged between the processing rollers. Additionally, it is desirable to provide disenabling means of this type adapted to prevent movement of a succeeding film unit from the container at least until the preceding film unit has been advanced a predetermined distance beyond the rolls, thus allowing time for the processing cycle to be terminated prior to movement of the succeeding film unit which should occur only after exposure thereof. The instant invention provides means for preventing movement of this succeeding film unit until it has been exposed by providing a single means for initiating the next exposure and processing cycle.

The film advancing apparatus identified generally by reference character 42 is comprised of a L-shaped member 44 having, as viewed in FIG. 1, slot 46 which is parallel with the direction of movement of a film unit 22 from the container towards the rolls and a slot 48 which is transverse to slot 46. L-shaped member 44 is attached to the camera structure by a pair of pins 50, each of which extends into the slot 46 and serve to limit the travel of member 44. A pin 52, which is mounted eccentrically upon an end of roll 38, extends into slot 48 for imparting reciprocating motion to L-shaped member 44. L-shaped member 44 has a film unit engaging member 54 pivotally mounted at 56 to the end of L-shaped member opposite the slot 48.

Film engaging member 54 is biased in a counterclockwise manner (as viewed in FIG. 2) by spring means 58 having one end mounted on an intermediate portion of L-shaped member 44 and its other end in contact with an arm portion 60 extending from the side of film engaging member 54. A lower portion 62 of member 54 is provided with a rearwardly (to the right as viewed in FIG. 3) inclined portion 64 and a raised portion 66. The inclined portion 64 of film engaging member 54 enables member 54 to either ride out of the openings in film unit 22 as L-shaped member 44 moves to the right (as viewed in FIG. 3) or alternatively, if the side of the film unit is provided with corrugations to ride over the corrugations as member 44 moves to the right thus preventing the film engaging member from moving the film unit back into the container. Raised portion 66 limits the distance that inclined portion 64 can extend into the openings in the film unit thereby preventing member 54 from moving more than one film unit from the container at a time.

Film engaging member 54 is supported during its reciprocating movement by a support or ramp 68 which is mounted on one end of an arm 70 by means of pins 72 which straddle arm 70. Arm 70 has an inclined surface 74 at one end, a tab 76 located intermediate its ends and a means, e.g., pin 78, for pivotally connecting the other end of arm 70 to the camera. Tab 76 rests on an intermediate portion of a second arm 80 which, as shown in FIG. 2, is pivotally connected to the camera by pin 82. Arm 80, of which there are two positioned at opposite ends of roll 40, has a roll supporting recess 84 at one end thereof which receives an extension 86 of roll 40. Arm 80 is biased in a clockwise manner (as viewed in FIG. 2) by means of spring 88 which is maintained in engagement with the end of arm 80 remote from recess 84 to urge roll 40 toward roll 38. MOvement of roll 40 toward roll 38 by arm 80 is limited by an abutment 90 which serves to limit the minimum thickness of the gap 92 between the rolls 38, 40. The rolls 38, 40 are provided at one end thereof with gears (not shown) which are connected by a gear train (not shown) to motor 61. By providing the camera 12 with power driven rolls the film units are advanced by the rolls at a constant speed thereby obviating the problems associated with manual movement of the film unit, e.g., a nonconstant pull on the film unit can provide for nonuniform spreading of the processing liquid thereby adversely affecting the quality of the print.

The operation of the film advancing apparatus will now be described. Upon actuation of the shutter, the forwardmost film unit 22 is exposed via actinic light entering exposure aperture 18. Subsequent to actuation of the shutter, a source of energy, e.g., motor 61, is connected via a gear train to the gears on the end of each roll to drive rolls 38, 40 in the direction shown by the arrows in FIG. 2. Rotating roll 38 in a clockwise manner, as viewed in FIG. 2, will cause pin 52 to reciprocate in slot 48. Movement of pin 52 within slot 48 will cause L-shaped member 44 to reciprocate towards and away from container 14. Film engaging member 54, which is pivotally coupled to member 44, is slightly biased about pin 56 in a counterclockwise manner by spring 58 such that the film engaging member 54 is resiliently urged into contact with the forwardmost film unit 22 in container 14. Reciprocating movement of L-shaped member 44 causes film engaging member 54, which is biased into one of the openings in film unit 22, to withdraw the film unit from the container 14 via opening 20. Should member 54 fail to enter one of the openings in the film unit on the first stroke, continued operation of the L-shaped member will provide the desired number of opportunities for such entry and engagement. Film engaging member 54 continues to move film unit 22 from the container until the leading edge of the film unit is located between the pressure-applying members 38, 40. This may only take one or more strokes by film engaging member 54, the number of strokes being a function of the diameter of the circle described by the rotating pin 52 and the distance between the leading edge of the film unit in the container and the nip of the rolls. Movement of the film unit through the rolls 38, 40 causes pod 28 to rupture and the rolls spread the processing liquid between the layers 24 and 26.

As the leading edge of the film unit engages the rolls 38, 40, the rolls are forced away from each other. MOvement of roll 40 downward as viewed in FIG. 2 causes arm 80 to rotate in a counterclockwise direction. Movement of arm 80 in a counterclockwise direction causes arm 70 to pivot about pin 78 in a clockwise direction due to its engagement therewith by tab 76. Clockwise rotation of arm 70 causes ramp 68 and arm portion 60 to move upwardly thereby moving film engaging member 54 in a clockwise direction about pivot 56 and against the force of spring 58 to a position whereat it is out of engagement with a film unit within the container. Arm 70 and ramp 68 are maintained in the disabling position by means of a resilient member 94 attached to a support 95 as shown in FIG. 3. Upward movement of arm 70 and its inclined surface 74 cams the lower portion 96 of member 94 to the left as viewed in FIG. 2 until arm 70 has passed to a position above the portion 96 of member 94 whereupon portion 96 moves under arm 70. It can readily be seen that in this position, L-shaped member 44 continues to reciprocate without causing the film engaging member 54 to withdraw another film unit from the container until the preceding film unit has passed from engagement with the rolls 38, 40. After the film unit passes from engagement with the rolls 38, 40, spring 88 rotates arm 80 in a clockwise direction to move roll 40 towards roll 38. However, arm 70 and ramp 68 are maintained in the disenabling position by means of member 94. When it is desired to expose the next succeeding film unit, the shutter of the camera is actuated. Actuation of the shutter causes member 98 having an inclined surface 100 at one end thereof to move downwardly into contact with member 94 to pivot the lower portion 96 of the latter in a clockwise manner until said lower portion 96 is out of engagement with the end of arm 70. In this latter position, spring 58 mounted on L-shaped member 44 urges ramp 68 and arm 70 downwardly as viewed in FIGS. 2 and 3 until tab 76 engages an intermediate portion of arm 80.

It should be obvious that the motor 61 used herein may be battery operated or it could be a manually wound spring motor.

From the foregoing, it can readily be seen that we have disclosed a novel means which is simple, compact and dependable, for moving individual film units from a container into the bite of a pair of pressure-applying rolls and which will prevent the withdrawal from exposure position of a succeeding film unit until the preceding film unit has passed from engagement with the rolls and the shutter is actuated to expose the succeeding film unit.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. In photographic apparatus including means for holding a container of stacked film units with one of said film units in position for exposure and a pair of juxtaposed rolls for engaging and moving a film unit through said apparatus, in combination:

film advancing means for engaging one of a plurality of film units within a container and moving said one film unit from said container into engagement with said rolls, said film advancing means being mounted for reciprocating movement toward and away from said rolls;

means mounting at least one of said rolls for movement toward and away from the other of said rolls;

drive means for driving at least one of said rolls and said film advancing means, said drive means being adapted to drive said film advancing means at least until said one film unit has been advanced to a position in which a portion of said film unit is located between said rolls; and disenabling means coupled with at least one of said rolls and with said film advancing means, said disenabling means being responsive to the movement of said rolls away from each other for disenabling said film advancing means to move another of said film units from said container until at least said one film unit has been advanced from engagement with said rolls.

2. Photographic apparatus as defined in claim 1 wherein said drive means simultaneously and continuously drives at least one of said rolls and said film advancing means when said one film unit is in engagement with said rolls.

3. Photographic apparatus as defined in claim 2 further including means drivingly connecting said film advancing means to one of said rolls.

4. Photographic apparatus as defined in claim 1 wherein said film advancing means includes film engaging means and spring means biasing said film engaging means in a first direction into engagement with a film unit positioned for exposure within said container, said disenabling means, upon sensing the displacement of said rolls apart from one another by a film unit engaged therebetween, being operative to displace said film engaging means in a direction opposite to said first direction and in opposition to the force of said spring means.

5. Photographic apparatus as defined in claim 1 wherein said disenabling means includes means for resiliently urging said rolls toward each other.

6. Photographic apparatus as defined in claim 5 wherein said means for resiliently urging said rolls toward each other includes a lever pivotally mounted intermediate its ends on the apparatus, one end of said lever being in engagement with one of said rolls and the other end of said lever being biased in a direction to urge said rolls toward each other.

7. In photographic apparatus including means for holding a container of stacked film units with one of said film units in position for exposure and a pair of juxtaposed rolls for engaging and moving a film unit through said apparatus, in combination:

film advancing means including a drive member mounted for movement toward and away from said rolls and film engaging means coupled to said drive member for engaging one of a plurality of film units within a container and moving said one film unit from said container into engagement with said rolls, said film advancing means being mounted for reciprocating movement toward and away from said rolls;

means mounting at least one of said rolls for movement toward and away from the other of said rolls;

drive means for simultaneously and continuously driving at least one of said rolls and said film advancing means when said one film unit is in engagement with said rolls; and disenabling means coupled with at least one of said rolls and with said film engaging means, said disenabling means being responsive to the movement of said rolls away from each other for moving said film engaging means to a position out of contact with a film unit within said container until at least said one film unit has been advanced from engagement with said rolls.

8. Photographic apparatus as defined in claim 7 including spring means for biasing said film engaging means into contact with said one film unit during initial movement of said one film unit from said container.

9. In photographic apparatus including means for holding a container of stacked film units with one of said film units in position for exposure and a pair of juxtaposed rolls for engaging and moving a film unit through said apparatus, in combination:

film advancing means including film engaging means for engaging one of a plurality of film units within a container and moving said one film unit from said container into engagement with said pair of rolls, said film engaging means being mounted for reciprocating movement toward and away from said rolls, said film engaging means having an inclined surface for contacting without moving said one film unit during movement of said film engaging means in a direction opposite to the direction of film movement by said rolls;

means mounting at least one of said rolls for movement toward and away from the other of said rolls;

drive means for driving at least one of said rolls and said film advancing means; and disenabling means coupled with at least one of said rolls and with said film advancing means, said disenabling means being responsive to the movement of said rolls away from each other for disenabling said film advancing means to move another of said film units from said container until at least said one film unit has been advanced from engagement with said rolls.

10. Photographic apparatus as defined in claim 9 wherein said film engaging means includes means for preventing the engagement and movement of more than one film unit at a time by said film engaging means.

11. In photographic apparatus including means for holding a container of stacked film units with one of said film units in position for exposure and a pair of juxtaposed rolls for engaging and moving a film unit through said apparatus, in combination:

film advancing means for engaging one of a plurality of film units within a container and moving said one film unit from said container into engagement with said pair of rolls, said film advancing means being mounted for reciprocating movement toward and away from said rolls;

means mounting at least one of said rolls for movement toward and away from the other of said rolls;

drive means for driving at least one of said rolls and said film advancing means;

disenabling means coupled with at least one of said rolls and with said film advancing means, said disenabling means being responsive to the movement of said rolls away from each other for disenabling said film advancing means to move another of said film units from said container until at least said one film unit has been advanced from engagement with said rolls; and holding means for engaging and maintaining said disenabling means in a first position for disenabling said film advancing means to move another film unit during advancement of said one film unit between said rolls and release means for moving said holding means out of engagement with said disenabling means for releasing and allowing said disenabling means to move to a second position wherein said film advancing means is capable of moving a film unit from said container.

12. Photographic apparatus as defined in claim 11 wherein said apparatus includes a shutter actuator, said shutter actuator being coupled to said release means for releasing and allowing said disenabling means to move to said second position upon actuation of said shutter actuator.

13. In photographic apparatus including means for holding a container of stacked film units with one of said film units in position for exposure and a pair of juxtaposed rolls for engaging and moving a film unit through said apparatus, in combination:

film advancing means for engaging one of a plurality of film units within a container and moving said one film unit from said container into engagement with said pair of rolls;

drive means for driving at least one of said rolls and said film advancing means;

disenabling means coupled with said film advancing means, said disenabling means being responsive to the movement of a film unit between said rolls for disenabling said film advancing means to move another of said film units from said container until at least said one film unit has been advanced from engagement with said rolls; and holding means for maintaining said film advancing means in a disenabled position until a succeeding film unit has been exposed.

14. Photographic apparatus as defined in claim 13 wherein said holding means maintains said film advancing means out of engagement with a film unit until the next succeeding film unit has been exposed.